(12) United States Patent
Lindbo et al.

(10) Patent No.: US 9,734,372 B2
(45) Date of Patent: Aug. 15, 2017

(54) HEAD-MOUNTED CODE SCANNER

(71) Applicant: OCADO INNOVATION LIMITED, Hertfordshire (GB)

(72) Inventors: Lars Sverker Ture Lindbo, Hertfordshire (GB); Paul Clarke, Hertfordshire (GB); Matthew D. Engle, Hertfordshire (GB)

(73) Assignee: OCADO INNOVATION LIMITED, Hatfield, Hertfordshire (GB)

( * ) Notice: Subject to any disclaimer, the term of this patent is extended or adjusted under 35 U.S.C. 154(b) by 0 days.

(21) Appl. No.: 14/895,747

(22) PCT Filed: Jun. 2, 2014

(86) PCT No.: PCT/IB2014/061897
§ 371 (c)(1),
(2) Date: Dec. 3, 2015

(87) PCT Pub. No.: WO2014/195853
PCT Pub. Date: Dec. 11, 2014

(65) Prior Publication Data
US 2016/0132707 A1     May 12, 2016

(30) Foreign Application Priority Data

Jun. 3, 2013 (GB) .................... 1309869.4

(51) Int. Cl.
*G06K 7/10* (2006.01)
*G06K 7/14* (2006.01)

(52) U.S. Cl.
CPC ......... *G06K 7/1413* (2013.01); *G06K 7/1091* (2013.01); *G06K 7/10544* (2013.01);
(Continued)

(58) Field of Classification Search
CPC ............... G06K 7/10722; G06K 2207/1012
(Continued)

(56) References Cited

U.S. PATENT DOCUMENTS

| 5,208,449 A | * | 5/1993 | Eastman | ............ G06K 7/10891 235/462.3 |
| 5,404,001 A | | 4/1995 | Bard et al. | |

(Continued)

FOREIGN PATENT DOCUMENTS

| WO | WO 93/14472 A1 | 7/1993 |
| WO | WO 2012/127120 A1 | 9/2012 |

OTHER PUBLICATIONS

International Search Report (PCT/ISA/210) issued on Aug. 26, 2014, by the European Patent Office as the International Searching Authority for International Application No. PCT/IB2014/061897.
(Continued)

*Primary Examiner* — Jamara Franklin
(74) *Attorney, Agent, or Firm* — Buchanan Ingersoll & Rooney PC

(57) ABSTRACT

The described mobile device for optically reading a machine-interpretable code, used for example in an order picking system for consumer and/or consumable goods, includes a head-mountable scanner with a code reader and a control unit controlling the head-mounted scanner to switch the code reader between a detection mode and a reading mode. In the detection mode, the code reader operates in a low power mode sufficient to detect the presence of a machine-interpretable code. The control unit switches the code reader into the higher-powered reading mode when the code is detected to optically read the code. A wireless communication device may also be provided to wirelessly transmit information corresponding to the scanned code to a remote receiving unit for storage and/or data processing.

44 Claims, 5 Drawing Sheets

(52) U.S. Cl.
CPC ..... *G06K 7/10722* (2013.01); *G06K 7/10861* (2013.01); *G06K 7/10891* (2013.01)

(58) Field of Classification Search
USPC .............................. 235/462.01–462.49, 454
See application file for complete search history.

(56) References Cited

U.S. PATENT DOCUMENTS

| | | |
|---|---|---|
| 2002/0125317 A1 | 9/2002 | Hussey et al. |
| 2003/0179350 A1 | 9/2003 | Hecht |
| 2006/0238550 A1 | 10/2006 | Page |
| 2008/0029603 A1* | 2/2008 | Harris ................ G06K 7/10851 235/462.31 |
| 2009/0001173 A1 | 1/2009 | Sevier et al. |
| 2014/0062673 A1 | 3/2014 | Ainasoja et al. |
| 2014/0158770 A1 | 6/2014 | Sevier et al. |

OTHER PUBLICATIONS

Written Opinion (PCT/ISA/237) issued on Aug. 26, 2014, by the European Patent Office as the International Searching Authority for International Application No. PCT/IB2014/061897.
Search Report issued on Dec. 9, 2014, by the British Patent Office for Application No. 1409681.2.
"Barcode Scanning with Google Glass: A Future of Fantasy?", Apr. 2013, XP055134534, Retrieved from the Internet: URL:http://www.scandit.com/2013/04/09/barcode-scanning-with-google-glass-a-future-or-fantasy-ifihadglass/, retrieved on Dec. 2, 2015, 5 pages.

* cited by examiner

HEAD-MOUNTED CODE SCANNER

CROSS-REFERENCE TO RELATED APPLICATIONS

The present application claims priority on United Kingdom Patent Application No. 1309869.4 filed 3 Jun. 2013, the entire content of which is incorporated herein by reference.

TECHNICAL FIELD

The present disclosure relates generally to devices for scanning machine-interpretable codes such as barcodes and the like, and more particularly to mobile scanners used, for example, in order picking systems to scan items and/or bins in such systems.

BACKGROUND

Barcode readers are well known and used in many different applications for optically reading identifiable symbols, such as UPC barcodes, QR codes, and other 1 or 2 dimensional barcodes. These barcodes provide a coded pattern of indicia, such as a number of bars of different widths and spacing in the case of a typical barcode, or a two-dimensional algorithm-developed pattern in the case of a QR code, which provide a unique visual identifier and can be read by an associated imaging or reading device, such as a scanner, camera, code reader, and the like.

Order picking systems are used in order fulfillment systems, such as those employed by online retailers to complete and dispatch orders of goods to consumers. Such goods may include, for example, consumer goods such as toys, books, etc, and consumable goods such as groceries. In automated or semi-automated order picking systems, especially those employed in large scale order fulfillment and delivery operations, such order picking systems utilize barcode scanners for tracking, inventory control, item identification, tote/bin tracking, etc. For example, labels containing identifying barcodes are commonly placed on bins/totes which are circulated through the order picking process and identified and tracked using barcode scanners/readers disposed at various points along the travel route, both within a warehouse during the order picking process and outside the warehouse during the order delivery process. As a result, barcode scanners/readers are required at various locations. These barcode scanners may include, for example, fixed barcode readers mounted proximate to a conveyor in order to be able to scan a bar code on a tote travelling along the conveyor or near the destination or order container.

Alternately, however, certain points in such complex order picking systems and processes require the manual scanning of totes, individual items, and/or other objects to be tracked in the order picking process. In such situations, therefore, a mobile barcode reader/scanner which is carried by the picker or other user of the system. Such barcode scanners carried by the picker typically take the form of a hand-operated scanner that the picker manually manipulates and which requires it to be pointed at the barcode to be able to read and identify each barcode label. Existing scanners carried by the picker in order picking operations typically come either as hand held devices, for example having a pistol grip type configuration, or as finger mounted devices connected to a wrist mounted battery and communications terminal.

Mobile barcode reasons which may be held or mounted to the wrist of a user and which employ a laser scanning system to read the barcodes on manipulated objects are therefore known. However, a disadvantage facing most existing systems is that the user must continuously actuate the reader every time a code is to be scanned. One known solution to this problem, as described in WO 93/11472, provides a hands-free laser scanner which is mounted to the user and which includes an infrared transmitter that is powered at all times, even when the laser engine is turned off, and a corresponding infrared receiver which together operate to detect the presence of an object within the range of the device. The infrared receiver, upon detecting the presence of an object within range based on reflected infrared energy from the object, operates control circuitry which in turn on the laser beam of the laser scanner.

However, all of these barcode scanning devices currently in use, and particularly the mobile or hand-operated scanners, have drawbacks. For example, certain devices require additional steps and/or time for the scanning operation and/or restrict the way the picker can handle the product. This is especially the case where the picker handles many different products and needs to rotate the item, in order to seek out and find the barcode on the packaging of the item and/or on the bin or tote, and when using systems which require two distinct systems such as an infrared transmitter/receiver used for detection of an objection and a laser engine used to actually read the detected barcode.

There therefore remains a need for an improved mobile code scanner for use in an order picking system which addresses at least one or more of drawbacks of existing barcode scanning devices.

SUMMARY

Accordingly, there is provided an improved mobile barcode reader, which may for example be used in an order picking system, inventory management system, mail or package tracking system, or the like. The mobile barcode reader described herein and its corresponding method of use enables both hands of the user of the device to be liberated for manipulation of the item being scanned, operating a computer, machinery, a vehicle, etc, thereby increasing the efficiency and ease of use of the device, as well as the possible applications for the use of such a device.

The terms "machine-interpretable code", "machine-readable code", or simply "code", as used herein are understood to include codes comprising any optically readable image, text or other code having any type and/or combination of lines, fields, markings or other indicia, which may be used to identify an item to which the code is applied. For example, such a machine-readable code or code as used herein may include, but is not limited to, barcodes or other one-dimensional stripe codes (such as UPC codes applied to products and which are used to scan products at cash registers), two-dimensional codes such as QR codes, any other suitably-configured multi-dimensional codes (including, for example, any three-dimensional machine-readable indicia or devices), and any combination of such codes.

The terms "scanner" or "code reader" as used herein are understood to include any device able to identify, read and/or interpret any such codes. A scanner as used herein may for example include, but is not limited to, an optical code reader which uses at least one of laser and camera based scanning technologies.

In accordance with one aspect of the present invention, there is provided a mobile device for optically reading a machine-interpretable code on an item, the device comprising: a head-mountable scanner including a code reader having an optical input, the code reader being affixed to a headwear article adapted to be worn on a head of a user, the code reader being disposed on the headwear article at a forward-facing position thereon to point the optical input in a direction of the user's field of vision, a scannable field of the optical input of the code reader falling within the user's field of vision when wearing the headwear article; a processing unit in electrical communication with the head-mountable scanner and including at least a power source and an electronic control unit, the electronic control unit controlling the head-mounted scanner to at least switch the code reader between a detection mode and a reading mode thereof; a wireless communication device in electrical communication with the electronic processing unit, the wireless communication device being operable to wirelessly transmit information corresponding to the scanned machine-interpretable code to a remote receiving unit for storage and/or data processing; wherein, in the detection mode, the code reader operates in a low power mode sufficient to detect the presence of at least one of the machine-interpretable code and an object representative of the presence of the machine-interpretable code within the scannable field; and upon detection of the presence of the machine-interpretable code within the scannable field, the electronic control unit switching the code reader into a higher-powered reading mode sufficient for the code reader to optically read the machine-interpretable code.

In accordance with another aspect of the present invention, there is provided a mobile device for optically reading a machine-interpretable code on an item, the mobile device comprising: a head-mountable scanner including a code reader comprising a camera having a camera lens, the code reader being affixed to a headwear article adapted to be worn on a head of a user, the code reader being disposed on the headwear article at a forward-facing position thereon to point the camera lens in a direction of the user's field of vision, a scannable field of the camera lens of the code reader falling within the user's field of vision when wearing the headwear article; a processing unit in electrical communication with the head-mountable scanner and including at least a power source and an electronic control unit, the electronic control unit controlling the head-mounted scanner to at least switch the code reader between a detection mode and a reading mode thereof; wherein, in the detection mode, the code reader operates in a low power mode sufficient to detect the presence of at least one of the machine-interpretable code and an object representative of the presence of the machine-interpretable code within the scannable field; and upon detection of the presence of the machine-interpretable code within the scannable field, the electronic control unit switching the code reader into a higher-powered reading mode which is operable for the camera of the code reader to capture one or more images of the machine-interpretable code and for the processing unit to read the machine-interpretable code based on said captured camera images.

In accordance with another aspect of the present invention, there is provided a mobile device for optically reading a machine-interpretable code on an item, the device comprising: a head-mountable scanner including a code reader having an optical input, the code reader being affixed to a headwear article adapted to be worn on a head of a user, the code reader being disposed on the headwear article at a forward-facing position thereon to point the optical input in a direction of the user's field of vision, a scannable field of the optical input of the code reader falling within the user's field of vision when wearing the headwear article, the code reader having at least an active reading mode wherein the code reader is operable to optically read the machine-interpretable code; and a processing unit in electrical communication with the head-mountable scanner and including at least a power source and an electronic control unit, the electronic control unit controlling the head-mounted scanner to autonomously switch the code reader into the active reading mode without requiring actuating input from the user, wherein the control unit is configured to switch the code reader into to the reading mode when at least two concurrent conditions are fulfilled: i) the presence of the machine-interpretable code is detected within the scannable field; and ii) an orientation of the code reader is disposed within a preselected acceptable range.

In one possible embodiment, the device described above includes a code reader which comprises a light emitting device, the code reader including a light source and at least a light sensor, the code reader emitting a low power light in the detection mode and emitting a higher power light in the reading mode.

In another possible embodiment, the mobile code reader of any of the devices described above described above may include a camera, wherein when the code reader operates in the higher-powered reading mode the camera is operable to capture one or more images of the detected machine-interpretable code and the processing unit is operable to read the machine-interpretable code based on said captured camera images.

In another possible embodiment, the mobile code reader of any of the devices described above may include a range finder device, the range finder device including at least a pointing light source and at least a light sensor operable to detect feedback from the pointing light source, the pointing light source emitting a low power laser light in the detection mode.

In another possible embodiment, the head-mountable scanner of the mobile code reader described above includes an illuminating light which is operable to emit a high power illuminating light in the reading mode.

Any of the devices described above may be incorporated into, or attached to the head-worn article adapted to be worn on the head of the user, and this head-worn article may include, in one possible embodiment, at least one of a band, a hat, a helmet and eyewear.

The processing unit of any of the devices described above may also be operable to measure at least a distance between the optical input of the code reader and the machine-interpretable code detected using the detected feedback from the light source during the detection mode, and the processing unit being operable to optimize optical properties of the images captured by the camera during the reading made based on said measured distance.

In another possible embodiment, the control system of the mobile code readers of any of the devices described above may be operable to switch the code reader between the detection mode and the reading mode autonomously, without requiring actuation input from the user. The control unit may also be configured to switch the code reader from the detection mode to the reading mode when at least two concurrent conditions are fulfilled: i) the presence of the machine-interpretable code is detected within the scannable field; and ii) an orientation of the code reader is disposed within a preselected acceptable range.

The code reader of any of the devices described above may be oriented in a tilted orientation relative to horizontal within said preselected acceptable range of said orientation of the code reader which corresponds to a downward-looking position of the head of the user when wearing the headwear article having said code reader thereon.

Any of the devices described above may further comprise a microelectromechanical sensor in communication with the processing unit and operable to detect at least said orientation of the code reader.

Any of the devices described above may also further comprise a manually actuated switch disposed within reach of the user and in communication with at least the processing unit, the manually actuated switch being operable to at least one of turn on the device and activate the detection mode, switch the code reader between the detection mode and the reading mode, and turn off the device.

Any of the devices described above may also comprise a wireless communication device in electrical communication with the electronic processing unit, the wireless communication device being operable to wirelessly transmit information corresponding to the scanned machine-interpretable code to a remote receiving unit for storage and/or data processing.

There is also provided, in accordance with another aspect of the present invention, a method of scanning machine-interpretable codes on an item using a wireless mobile device, the method comprising: operating, in a low power detection mode, a scanner mounted on a headwear article, and using the scanner to detect the presence of one or more objects within a scannable space of the scanner; in response to the detection of the presence of one or more of said objects within the scannable space, switching the scanner to a higher power reading mode, and reading one or more machine-interpretable codes using the scanner operating in the higher power mode; and wirelessly transmitting information relating to the machine-interpretable codes read by the scanner to a remote location for storage and/or data processing.

The method described above may further include a step of identifying to the user that said bar codes have been read by the scanner, and this may include using both visual and audible warning signals. The method as described above may also further comprises wirelessly transmitting the information to a remote location for storage and/or data processing, and/or storing information unique to the scanned bar code.

The method described above may further include scanning barcodes in an order picking system for consumer and/or consumable goods.

BRIEF DESCRIPTION OF THE DRAWINGS

Reference is now made to the accompanying drawings, showing by way of illustration a preferred embodiment thereof, and in which.

DETAILED DESCRIPTION

Figure 1:
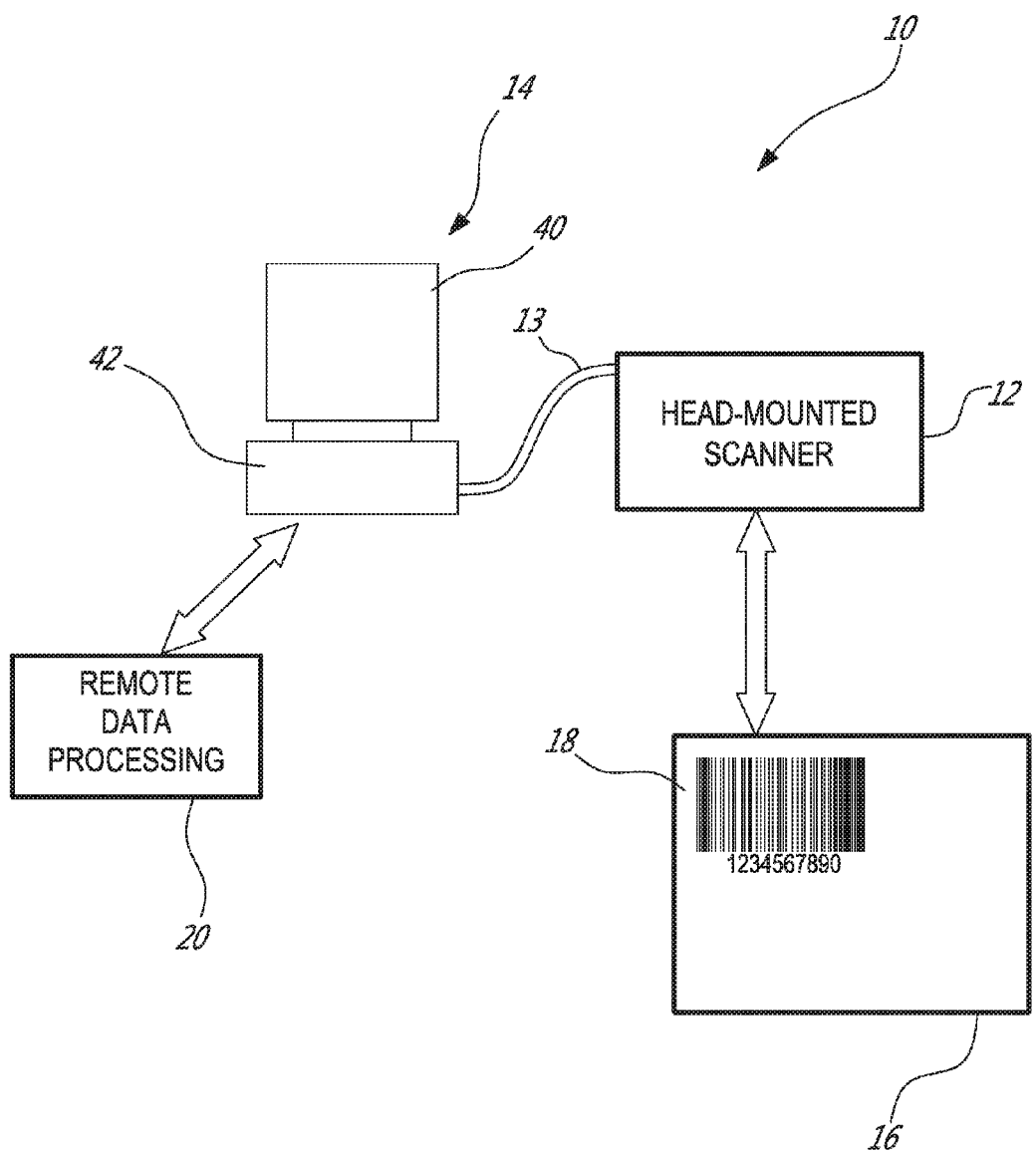
FIG. 1 is a schematic of a mobile device for optically reading machine-interpretable codes.

The mobile code reader or device for optically reading machine-interpretable codes of the present disclosure will be described below with particular reference to their use in an order picking system, such as one used as part of the fulfillment and delivery of orders for consumer and/or consumable goods. Such order picking systems may include automated or semi-automated order picking systems, for example those employed in large scale order fulfillment and delivery operations, such as those used by online grocery stores for example. However, it is to be understood that the present mobile barcode reader and its method of use may be used in other applications whereby it may be useful and/or necessary to scan articles, such as item tracking, inventory control, item identification, container, letter, parcel or bin tracking, etc.

Mobile code readers in accordance with the present disclosure may be used with particular advantage by a user who may need to manually manipulate (i.e. with their hands) the item to be scanned or whom may require "hands-free" scanning of an object. For example, a driver of a fork-lift or other vehicle may need to keep both on the wheel or otherwise in contact with the controls of the vehicle while still being able to scan an identified object.

With known scanning devices, even mobile ones, this is not readily feasible as the user or operator typically needs to hold on to a grip-type mobile barcode reader or point a wrist or finger mounted scanner at the barcode on the item being handled. In either case, only one remaining hand of the user is available for physically holding the article or articles. The presently described mobile code reader enables both hands of the user of the device to be completely liberated for manipulation of the item being scanned or for performing other tasks, such as operating a vehicle or other machinery, thereby providing advantages over known mobile devices including, but not limited to, increasing the efficiency and ease of use of the device, and therefore the speed and/or cost effectiveness of the operation.

The head-mounted scanner 12 of the present device thus enables a machine-interpretable code to be instantly scanned, as the item having the barcode thereon is within the field of vision of the device, thereby permitting the user to manipulate the article, if necessary using two hands, in order to find the barcode. Similarly, the head-mounted scanner 12 also enables "hands-free" scanning of barcodes by the user, without requiring the user to use his or her hands for this purpose. This therefore enables the user to have his or her hands free to perform other tasks, such as operating a vehicle or other machinery, for example. By having the scanning location in the most convenient place, namely in front of the user (or the picker, in the case of use of the present device in an order picking system), the act of identifying the location of the barcode and the scanning of the barcode are merged into one single activity, neither of which require the user's hands. The present mobile code reader may also enable improved health and safety conditions, as it does not require the user to awkwardly manipulate and scan an item while it is being moved, turned or otherwise manipulated, or to remove the user's hands from other equipment or machine operating controls (e.g. a vehicle steering wheel, etc.).

FIG. 1 depicts a schematic of the present mobile code-reading device 10 or simply "code reader", in accordance with one embodiment of the present disclosure. The code-reading device 10 is operable to optically read machine-interpretable codes 18, such as barcodes, and therefore is used for scanning a machine-interpretable code 18 disposed on an item 16 which is to be identified, tracked, or alternately in order to determine or convey a given data set of information. As noted above, this machine-interpretable code 18 may include a barcode, as shown In FIG. 1, or any other type of machine-readable/interpretable code, and may include codes comprising any optically readable image, text or other indicia having any type and/or combination of lines, fields, markings, etc, and which may be used to identify an item to which the code is applied. These can include barcodes or other one-dimensional stripe codes, QR codes or other two-dimensional codes, or any other suitably-configured multi-dimensional code that is optically readable and interpretable by a scanner. While the term "barcode" will be used below with reference to the code 18 on the item 16, it is to be understood that this is but an exemplary embodiment for the purposes of the present description.

In the embodiment described above, wherein the present mobile code reader 10 is used as part of an order picking system for an order fulfilment and delivery processes, the item 16 identified by the barcode 18 may be a bin or tote into which purchased products are placed, a pallet or other larger storage container on or within which is disposed a number of smaller items or bins, or alternately may be the purchased products themselves. The barcode 18 may be on a label which is affixed to the item 16, or may be printed or otherwise applied directly to the item 16.

The mobile barcode reader 10 includes generally a head-mounted scanner 12 in electrical communication with an electronic processing unit 14. This may be done using cable(s) 13 as shown in FIG. 1, or alternately the head-mounted scanner 12 and the electronic processing unit 14 may be either directly incorporated into a common assembly (i.e. they may be integrated together) or may be separate as shown but disposed in wireless communication rather than being tethered directly using the cable(s) 13. The wireless connection between the head-mounted scanner 12 and the electronic processing unit 14 may be achieved using short range radio communication technology, such as Bluetooth™.

Figure 4:
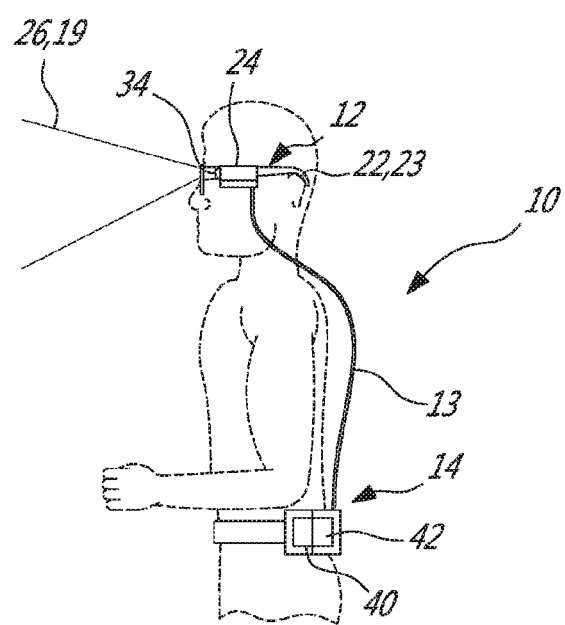
FIG. 4 is a side view of a user wearing the mobile code reader and head-mounted scanner of FIG. 3.

In the embodiment depicted in FIG. 4, for example, only the relatively lightweight head-mounted scanner 12 portion of the barcode reader 10 is actually mounted to the head of the user, and the remaining components, such as the processing unit 14, including for example a power source such as a battery, control unit and/or radio communication components, are disposed together in a separate unit that may be attached to another part of the user's body (such as worn on a belt as shown, for example).

In all cases, however, the barcode reader assembly 10 is preferably mobile, in that it can be easily worn by the user of the device, and more particularly wherein at least the head-mounted scanner portion 12 thereof is adapted to be worn on the head of user. In one possible embodiment, the barcode reader assembly 10 is wireless, in that it is disposed in wireless communication, if and when necessary, with a remote data processing unit 20.

Figure 3:
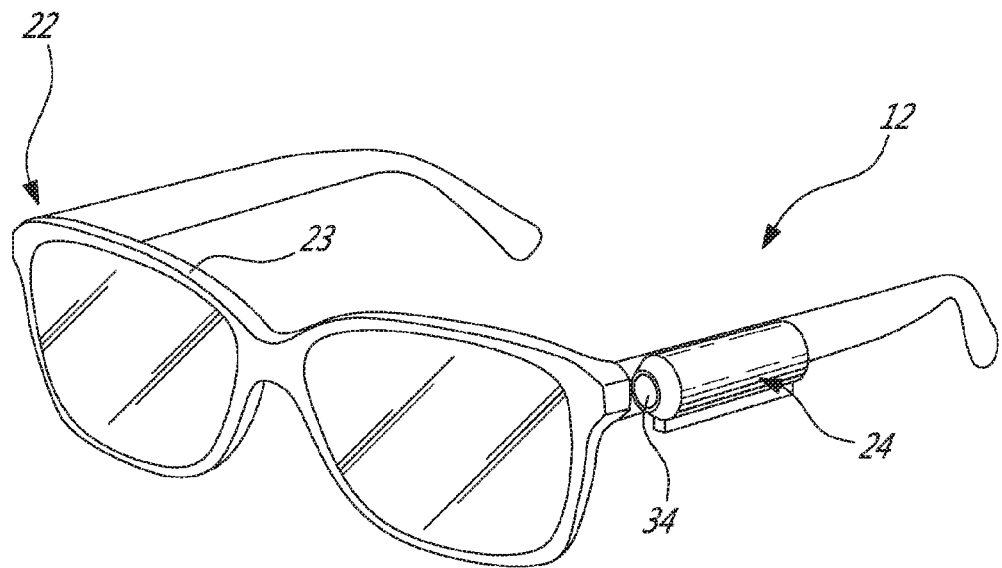
FIG. 3 is a perspective view of a head-mounted scanner of a mobile code reader in accordance with one embodiment of the present disclosure.

Referring to the embodiment seen in FIGS. 3-4, the head-mounted scanner 12 of the barcode reader 10 includes at least a code reader 24 having an optical input/output 34 and which is mounted to a headwear article 22.

The code reader 24 of the head-mounted scanner 12 may be of a number of different types. In one embodiment, the code reader 24 includes a light emitting device which has light source and the optical input/output 34 may include a lens from which the light source is projected and a light sensor into which light signals are received.

In an alternate embodiment, however, the code reader 24 includes a camera (either in addition to a light source or instead), in which case the optical input/output 34 may include a camera lens. Although a camera which does not require additional illumination or light source is possible, in a particular embodiment wherein the code reader 24 includes a camera for reading the barcodes, an additional illumination element may be provided in order to better illuminate at least a portion of the scannable field of the camera, thereby improving the resolution of the image taken by the camera. By using the illumination element to provide more light when the camera is in operation (ex: during in the scanning or reading mode), a smaller camera aperture and a shorter exposure time can be used and better visual resolution of the camera image taken is thus enabled. Further, a range finder may be used in conjunction with the camera of the code reader 24, in which case the user uses a wave source of the range finder (which may include, for example, a laser, infrared, ultrasound, radar, and the like) to produce a corresponding wave (light, sound, radio, etc.) to target a barcode to be scanned, and the feedback from the wave source received by a sensor of the code reader 24 is used to adjust the focal length of the camera, or alternately used to broaden or narrow the scanned vision field of the camera making up the code reader. In one particular embodiment, the range finder is optical and produces a "pointing light", which may employ a laser for example, In this embodiment, therefore, the code reader 24 may include a laser pointing light which is activated by the user to act as a target acquiring light, used by the operator of the device 10 so as to know when the camera of the code reader 24 is pointed at a desired target, e.g. a barcode to be scanned. The feedback from the laser pointing light is received by an optical sensor of the code reader 24 and used, once a barcode target is acquired, to switch the device from a lower-powered mode to a high-power scanning mode of the device and/or to better focus the image taken by the camera of the optical barcode scanning portion of the code reader. In the lower-power detection mode, therefore, the pointing light or other optical range finder is therefore in operation and employed to target and measure the distance to the barcode to be scanned, thereby optimising the focal length of the camera lens (or the digital equivalent thereof) for taking a digital image of the barcode. This digital image of the "scanned" barcode is then read using the processing unit 14 running a suitable image processing and/or image recognition software capable of recognizing and reading barcodes in digital images captured by the camera. In this embodiment, therefore, no laser scanning of the barcode code, for the purposes of reading the barcode, is performed when the device is operating in the high-powered mode. While a low-powered laser may be used in this embodiment as the range finder, or optical pointing light, used in the low-power detection mode, the camera of the code reader 24 acts as the only "reader" or "scanner" in operation during the high-power mode used for actually reading the barcodes.

Figure 5:
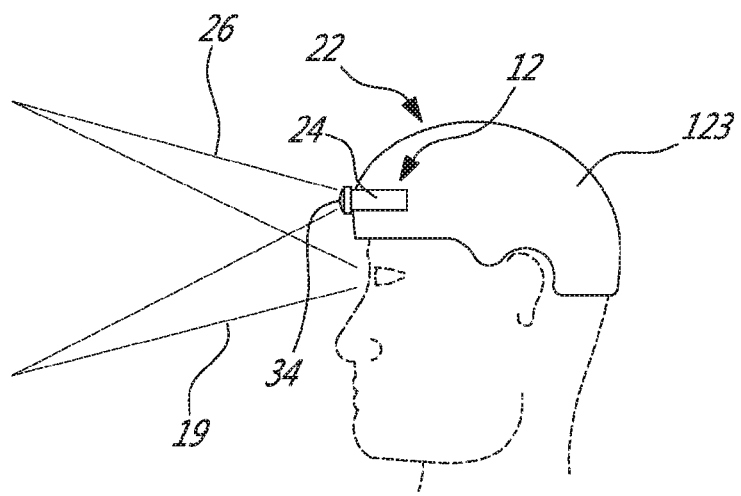
FIG. 5 is a side view of a user wearing a head-mounted scanner in accordance with an alternate embodiment, showing the user's field of vision and the corresponding scannable field of the head-mounted scanner.
Figure 6:
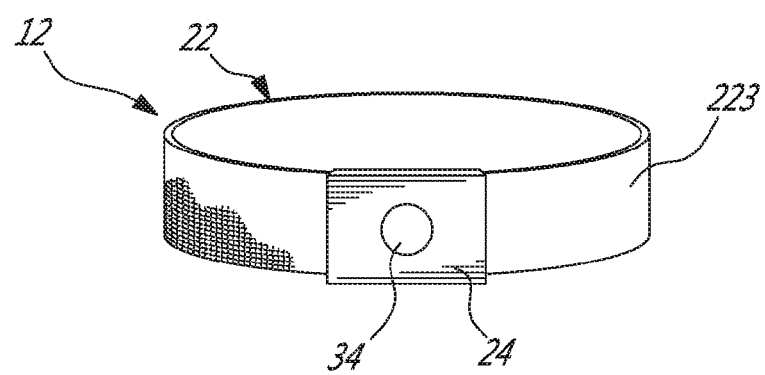
FIGS. 6 and 7 are front views of head-mounted scanners in accordance with alternate embodiments of the present disclosure.
Figure 7:
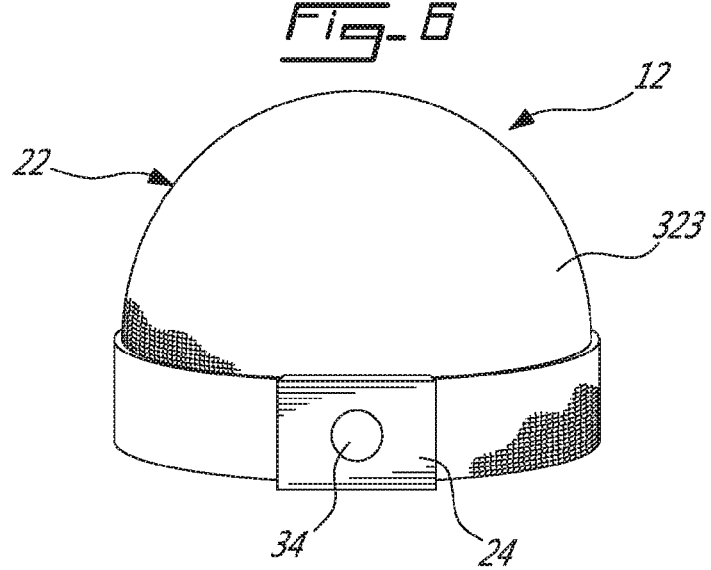

In the depicted embodiment of FIGS. 3-4, the headwear article 22 is eyewear, and more particularly still a pair of glasses 23 to which the code reader 24 of the head-mounted scanner 12 is fastened. The term "headwear article" as used herein is understood to include any removable article capable of being worn on the head, face or eyes of a user, such as but not limited to: eyewear such as glasses 23 (as shown in FIG. 3) or goggles, a helmet or other protective headgear 123 (as shown in FIG. 5), a headband (as shown in FIG. 6), a hat (as shown in FIG. 7), and the like.

The code reader 24 may be detachably mounted to the headwear article 22 using a mounting unit or other detachable or permanent fastening mechanism, such as to secure the code reader 24 in place on the headwear article 22. In all cases, however, the code reader 24 may be mounted on the headwear article 22 in a forward-facing position and orientation, proximate to the front of the headwear article and at least such that an optical input 34 of the code reader 24 points/faces in a direction within the field of vision of the user when wearing the headwear article 22. As best seen in FIG. 5, the scannable field 26 of the code reader 24 (or more precisely, of the optical input 34 thereof) falls within the field of vision 19 of the user wearing the headwear article 22 having the head-mounted scanner 12 thereon.

Accordingly, the scannable field 26 will always fall within and follow the direction and orientation of the user's field of vision, such that the code reader 24 will always point in the direction that the user is looking. As the user moves his or her head, the code reader 24 will necessarily follow. As such, the user's hands are left free to manipulate the item 16 and to perform other tasks (such as operate a vehicle or other machinery, control a computer, etc.), and as the user looks at the item to be scanned the item will remain in the scannable field 26 of the code reader 24 during the work operation, such as manipulation of the item. This maximizes the efficacy and accuracy of the scanning of the barcode 18 on the item 16 during any manual movement, transport and/or manipulation of the item by the user wearing the head-mounted scanner 12.

Referring now back to FIGS. 1 and 4, the processing unit 14 includes a power source 40 and an electronic control unit 42 which controls the operation of the entire mobile barcode reader 10. The electronic control unit 42 is programmed and/or otherwise configured to control the head-mountable scanner 12, either wirelessly or via hard-wired communication, such as to switch the code reader 24 of the head-mounted scanner 12 between at least two operational modes thereof. More particularly, the electronic control unit 42 is operable to switch the code reader 24 of the device between a lower-powered detection (or "range finding") mode and a higher-powered reading (or active "scanning") mode. In the lower-powered detection or "range finding" mode, the code reader operates in a low power consumption condition in which it is still operable to detect at least the presence of a predetermined target object within the scannable field 26. The target object may be any number of different objects, including but not limited to, identifiers located on the item to be scanned itself. Upon detection of the presence of the one or more of these target objects within the defined space by the code reader operating in the detection mode, the electronic control unit then switches the code reader into the higher-powered reading mode. In the reading mode, the code reader operates at a higher power, sufficient to optically read one or more machine-interpretable codes in the defined scanned space. Optionally, but not necessarily, in the detection or "range finding" mode, the system may also detect a given range or distance between the identified readable code and the optical input/output 34 of the code reader 24 of the head mounted scanner 12.

In the detection mode, the code reader 24 of the head-mounted scanner 12 operates in a low power consumption condition, but which remains sufficient to scan (either continuously, at predetermined intervals, or when actuated by the user) a region 41 within the scannable field for the presence of any objects therein.

This "range finding" mode, enables the code reader 24 of the head-mounted scanner 12 to save energy by operating in a lower power consuming state, while still scanning the region 41 of the scannable field (within the user's field of vision 19) in order to detect whether there are any objects present therein.

Upon detection by the code reader 24 of one of the predetermined objects, indicators or machine-readable codes within the scannable field 26, this information is sent back to the electronic control unit 42 of the processing unit 14. The electronic control unit 42 then switches the code reader 24 of the head-mounted scanner 12 from the lower-powered detection mode, into a higher-powered "reading" or "scanning" mode. In this scanning mode, the code reader 24 is operable to actually optically read the barcode 18 and then identify and/or transmit the information represented by the scanned barcode back to the processing unit 14. In one possible, but not necessarily essential embodiment, this switching by the electronic control unit 42 of the code reader 24 between the range finding mode and the reading mode is performed autonomously, without requiring input from the user.

In the embodiment described further above wherein the code reader 24 includes a camera and an additional "flash" or illumination device for lighting the scannable field of the camera in order to improve the resolution of the image taken by the camera, this additional illumination device may be activated (i.e. turned on) when the code reader is switched into the reading mode. The term "flash" or "camera flash" as used herein is intended to encompass both a periodic light (in the sense of a traditional camera flash) as well as a continuous light which is similarly used to illuminate the immediate environment of the camera for the purposes of improve the quality of the image captured by the camera. Accordingly, when the illumination is active, more power is consumed, but while operating in the range finding mode, the illumination is deactivated and thus power usage is less. Alternately, the camera does not require an additional light source or illumination device, in which case the code reader 24 may not emit light but the camera which makes up the code reader still operates in a lower power consumption mode in the range finding mode and a higher power consumption mode in the reading mode. In the lower-power detection mode, however, a laser or other range-finder waves (either light based, such as laser or infrared, sound based, such as ultrasound, or radio based, such as radar) may be employed to measure the distance to the barcode to be scanned, thereby optimising the focal length of the camera lens (or the digital equivalent thereof) for taking an image of the barcode which is subsequently read using the processing unit 14 running suitable image processing and/or image recognition software capable of recognizing and reading barcodes in the captured images.

The range-finder may also be a stereoscopic type device, which employs two or more cameras having known distances therebetween, the images from these cameras thereby being able to be used by the processing unit to calculate a distance to the object captured in the images obtained simultaneously from these two stereoscopic range-finding cameras.

Accordingly, when operating in the detection mode, the code reader 24 operates effectively as a low energy range finding device, which is capable of detecting when/if an item is located in the space in front of the operator, i.e. in the scannable space 41 of the code reader 24 and within the vision field 19 of the user. In another alternate embodiment, a separate low power range finding device may be provided, i.e. distinct from the optically scanning code reader 24. In either case, however, only once the presence of a recognisable barcode 18 is detected within the scannable space does the electronic control unit 42 switch the head-mounted scanner 12 into its higher powered reading mode such that the barcode 18 is actively read (ex: by illuminating, scanning, digital image capture, or otherwise). As such, the power consumption of the code reader 24 and thus of the head-mounted scanner 12 is significantly reduced relative to a device which always operates in an active scanning/reading mode, for example. Using the present device, the higher power full-scanning operation of the device is limited only to when this is actually required. This results in numerous advantages such as reduced cost and weight for batteries and other power sources, extended battery life, longer user times, etc.

In the aforementioned embodiment wherein the code reader 24 includes a light source, this may include a laser, for example, which is emitted from a lens of the code reader 24. In this embodiment, therefore, the code reader emits only a low power laser light when operating in the detection mode, and emits a higher powered laser light when operating in the reading mode. In an alternate embodiment, however, a low power "pointer light" may also be provided, at least when operating in the detection mode, in order to help guide the user of the device as to where the code reader 24 is scanning and where within the scannable field the item or code to be scanned is to be located. This low power "pointer light" may either be a separate light (such as a lower powered laser pointer) or integrated into the light emitting portion of the code reader 24, whether this is of the camera or the laser coder reader type.

The code reader 10 may also include an input-output and/or display device (such as a small screen display, sound producing device, etc.), which is in communication with the processing unit 14. This display device may, in one possible embodiment, provide one or more indicators to notify the user that a valid barcode 18 has been identified and read by the code reader 24 of the head-mounted scanner 12. Such indicators may be audible and/or visual. For example, an audible note may sound when the head-mounted scanner 12 identifies and scans a barcode 18 within the vision field 19 of the user. Such indicators, audible and otherwise, can also be used to indicate different types of errors, in addition to identifying a valid scan of a barcode. For example, when an unexpected or incorrect product is scanned, a warning signal may be programmed to sound and/or be displayed. Such audible and/or visual prompts may also be used, in an alternate embodiment, to prompt the operator to use a screen for further interaction, or to take another pre-determined action. In a variant of this embodiment, the display device may also be operable to provide spoken or text messages provided to the operator.

In yet another embodiment, the code reader 24 of the head-mounted scanner 12 can be used to select from a number of pre-defined messages. In this embodiment the scanner 12 may include a pointer device so that the operator can point it to a specific location which would contain a barcode representing the message the operator wishes to send. Versions of this embodiment would include barcodes on the gloves or sleeves of the uniform, and barcodes fixed within the work area. Messages conveyed this way could include "log on (this station)", "log off", "confirmed", "need assistance", etc.

Figure 2:
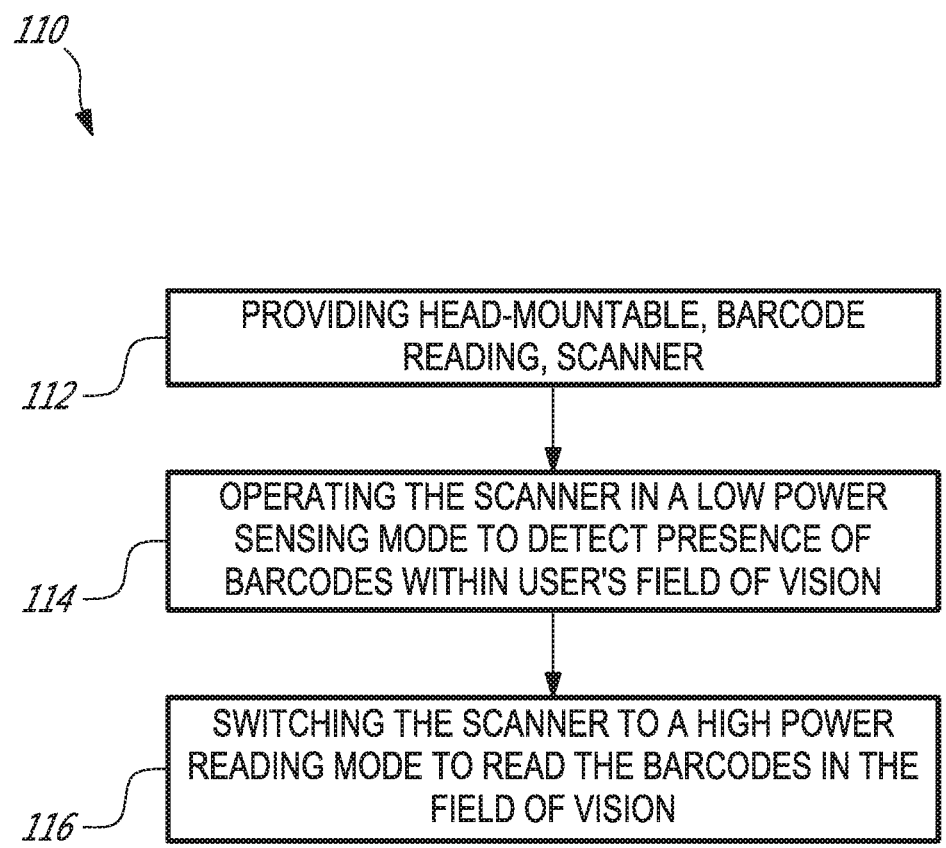
FIG. 2 is a block diagram of a method of using a device of FIG. 1.

Referring now back to FIG. 2, in use the aforementioned barcode reader 10 is operated generally as follows as part of a method 110 for scanning barcodes on items (such as but not limited to items used in an order picking system for consumer and/or consumable goods). The method 110 includes generally the steps of: providing the head-mounted barcode reading scanner 112; operating the scanner in a low power detection mode to detect the presence of barcodes within the defined space in front of the user 114; and switching the scanner to a high power reading mode to read the barcode(s) 116.

At 112, providing a head-mountable, machine-readable code scanner may more particularly include, providing a head-mounted scanner 12 mounted on a headwear article 22 adapted to be worn on the head of user such that a scannable space 41 of the scanner 12 falls within user's field of vision 19.

At 114, operating the scanner may more particularly include, operating the head-mounted scanner 12 in a low power mode, the head-mounted scanner being operable only to detect the presence of one or more items within the scannable space 41 of said field of vision 19 in the low power mode. This may further include, in at least one embodiment, emitting a lower power scanning light form the head-mounted scanner 12 in the detection mode and emitting a higher power scanning light from the head-mounted scanner 12 in the high power mode.

At 116, switching the scanner to a higher-power reading mode may more particularly include, in response to the detection of the presence of one or more items within the scannable space 41, switching the head-mounted scanner 12 into the high power mode, and then reading the bar codes 18 within the scannable space 41 using the head-mounted scanner 12 operating in the high power mode.

Additional steps of the method 110 may also include, for example, any one or more of the following additional steps; identifying to the user that the barcode(s) has(have) been read by the head-mounted scanner, such as by using an audible and/or visual indicator; wirelessly transmitting information read from the scanned barcode to a remote location for storage and/or data processing; and/or locally storing the information relating to the scanned barcode in the barcode reader 10 itself, such as in the processing unit 14 thereof.

In an alternate embodiment, the head mounted scanner 12 may also be provided with a separate sensor which is operable to determine at least the orientation of the head-mounted scanner 12, and thus the orientation and/or relative position of the user's head when wearing the headwear article have the head-mounted scanner thereon. This additional orientation sensor may comprise, for example, a microelectromechanical sensor (MEMS) having one or more of a gyroscope, accelerometer, a digital compass and an inertial module. This sensor is operable to detect, for example, when the user is looking down and when the user is looking straight ahead. Accordingly, this additional orientation sensor can be used to turn the code scanner 24 on and off, or from low to high power operation modes thereof. For example, the control system may be configured to activate the high-powered reading/scanning mode of the code scanner 24 upon detection by the sensor that the user looks down, as this is the expected head position when the user picks up or manipulates an article to be scanned, or looks in another predetermined direction directed to an object to be scanned. However, when the user looks up towards the horizon, this additional sensor may be used to turn the code reader 24 off, (i.e. switch it to an "off" mode). This may be useful, for example, both to further save power consumption as well as prevent any undesirable issues of laser light or camera flash illuminations blinding co-workers nearby. Alternately, the control system may be configured such that there needs to be two concurrent conditions fulfilled before the high-powered scanning mode of the code scanner 24 is activated, namely an object is detecting within range of the device using the pointing light or optical range finder AND the orientation sensor detects that the user's head is positioned in a predetermined position (e.g. tilted downwards).

Figure 8:
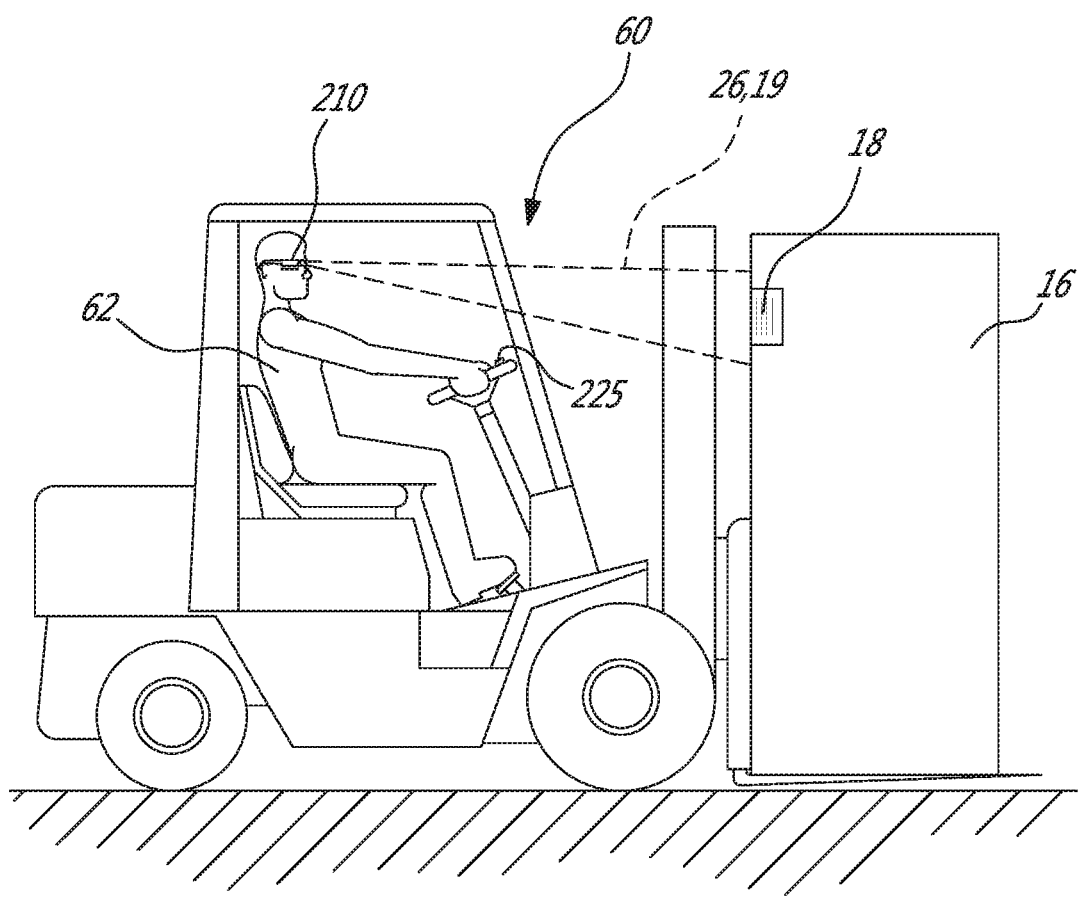
FIG. 8 is a schematic side view of a vehicle operated by a user wearing an alternate embodiment of the head-mounted scanner.

Referring now to FIG. 8, as described briefly above, in accordance with one particular embodiment a mobile code-reading device 210 may be advantageously used by an operator of a vehicle 60, such as a forklift truck for example, for the purposes of scanning barcodes 18 disposed on pallets or containers 16 that are manipulated by the vehicle and/or which the user of the vehicle wishes to identify and scan. The mobile code-reading device 210 as used in this particular embodiment is substantially the same as the device 10 described above, and similarly includes a head-mounted scanner 12 which is worn by the user (or driver) 62 of the vehicle 60 on his or her head, and enables the machine-interpretable code 18 to be read when a barcode 18 on a container 16 is located within the scannable field 26 of the code reader of the head-mounted scanner 12, which corresponds generally to, or at least lies within, the field of vision 19 of the driver 62. This accordingly permits the driver 62 of the vehicle 60 to maintain both of his/her hands on the steering wheel or other controls of the vehicle, while still being able to scan barcodes 18 disposed on objects being manipulated by the vehicle. The head-mounted scanner 12 of the code-reading device 210 therefore enables "hands-free" scanning of barcodes by the driver 62 of the vehicle 60. Because the head-mounted scanner 12 necessarily points in the direction of the vision of the driver, the ease with which barcodes on containers being manipulated by the vehicle, which may be particularly useful and relevant in the case of fork-lift trucks and their operators in warehouse or storage facilities, can be scanned/read by the device 210 is particularly advantageous. This embodiment also permits improved health and safety conditions, as it does not require a vehicle driver to cease operating the vehicle, or remove one or both hands from the vehicle controls in order to perform a scanning operation.

The device 210, which is particularly adapted to be worn by operators of machinery or vehicles 60, may also further include a manually actuated switch 225 disposed, for example, on the steering wheel or other controls of the vehicle. This manually actuated switch 225 is used by the operator 62 to activate the code-reading device 210 worn on his or her head, in order to trigger (i.e. "turn on") the low-power "range finding" mode of the device 210 as described above. This may also in turn activate the range finding pointing light, which may be a low powered laser for example, that is used to detect the presence of a barcode 18 and to permit more accurate data capture when the device 210 is automatically (i.e. without manual actuation) switched over into the higher-power scanning mode (e.g. image capture using a camera of the device 210). The actuation signal may be optimally transmitted from the switch 225 to the head-mounted scanner 12 of the device 210 wirelessly, via Bluetooth™ or otherwise. However, a wired connection therebetween may also be possible, whereby the head-mounted scanner portion 12 of the device 210 is connected or tethered to the vehicle 60, or at least to the switch 225 mounted thereon. The switch 225 may also be used by the operator to turn off the device 210.

The above description is meant to be exemplary only, and one skilled in the art will recognize that changes may be made to the embodiments described without departing from the scope of the invention disclosed. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. Still other modifications which fall within the scope of the present invention will be apparent to those skilled in the art, in light of a review of this disclosure, and such modifications are intended to fall within the appended claims.

The invention claimed is:

1. A mobile device for optically reading a machine-interpretable code on an item, the device comprising:
a head-mountable scanner including a code reader having an optical input, the code reader being affixed to a headwear article configured to be worn on a head of a user, the code reader being disposed on the headwear article at a forward-facing position thereon to point the optical input in a direction of the user's field of vision during operation such that a scannable field of the optical input of the code reader will fall within the user's field of vision when wearing the headwear article;
a processing unit in electrical communication with the head-mountable scanner and including at least a power source and an electronic control unit, the electronic control unit controlling the head-mounted scanner to at least switch the code reader between a detection mode and a reading mode thereof; and
a wireless communication device in electrical communication with the processing unit, the wireless communication device being operable to wirelessly transmit information corresponding to a scanned machine-interpretable code to a remote receiving unit for storage and/or data processing;
wherein, in the detection mode, the code reader operates in a low power mode sufficient to detect a presence of at least one of the machine-interpretable code and an object representative of the presence of the machine-interpretable code within the scannable field;
upon detection of the presence of the machine-interpretable code within the scannable field, the electronic control unit switching the code reader into a higher-powered reading mode for the code reader to optically read the machine-interpretable code, and
wherein the code reader includes a range finder device for distance detection of the machine-interpretable code, the range finder device including at least a wave source and at least a sensor operable to detect feedback from the wave source, the wave source emitting a low power range-finding wave in the detection mode.

2. The mobile device of claim 1, wherein the code reader comprises a camera, wherein when the code reader operates in the higher-powered reading mode the camera is operable to capture one or more images of the detected machine-interpretable code and the processing unit is operable to read the machine-interpretable code based on said captured camera images.

3. The mobile device of claim 1, wherein the head-mountable scanner includes an illuminating light which is operable to emit a high power illuminating light in the reading mode.

4. The mobile device of claim 1, wherein the processing unit is operable to measure at least a distance between the optical input of the code reader and the machine-interpretable code detected using detected feedback from the wave source during the detection mode, and the processing unit being operable to enhance optical properties of images captured by the camera during the reading mode based on said measured distance.

5. The mobile device of claim 1, wherein the wave source of the range finder device comprises one of a laser, infrared, ultrasound and radar.

6. The mobile device of claim 1, wherein the electronic control unit is operable to switch the code reader between the detection mode and the reading mode autonomously, without requiring actuation input from the user.

7. The mobile device of claim 6, wherein the electronic control unit is configured to switch the code reader from the detection mode to the reading mode when at least two concurrent conditions are fulfilled: i) a presence of the machine-interpretable code is detected within the scannable field; and ii) an orientation of the code reader is disposed within a preselected acceptable range.

8. The mobile device of claim 7, wherein the code reader is oriented in a tilted orientation relative to horizontal within said preselected acceptable range of said orientation of the code reader which corresponds to a downward-looking position of the head of a user when wearing the headwear article having said code reader thereon.

9. The mobile device of claim 7, comprising a microelectromechanical sensor in communication with the processing unit and operable to detect at least said orientation of the code reader.

10. The mobile device of claim 1, wherein the electronic control unit comprises a manually actuated switch disposed to be within reach of a user during operation and in communication with at least the processing unit, the manually actuated switch being operable to at least one of turn on the device and activate the detection mode, switch the code reader between the detection mode and the reading mode, and turn off the device.

11. The mobile device of claim 1, wherein the object representative of the presence of the machine-interpretable code includes one or more target indicators disposed on the item.

12. A method of scanning machine-interpretable codes on an item using a wireless mobile device, the method comprising:
  operating, in a low power detection mode, a scanner mounted on a headwear article, and using the scanner to detect the presence of one or more objects within a scannable space of the scanner;
  in response to the detection of the presence of one or more of said objects within the scannable space, switching the scanner to a higher power reading mode, and reading one or more machine-interpretable codes using the scanner operating in the higher power mode; and
  wirelessly transmitting information relating to the machine-interpretable codes read by the scanner to a processing unit in a remote location for at least one of storage and data processing,
  wherein the scanner comprises a range finder device, the step of operating the scanner in the low power mode comprising using a wave source of the range finder device to emit a low power range-finding wave to target said one or more objects.

13. The method as defined in claim 12, comprising identifying to the user that said machine-interpretable codes have been read by the scanner.

14. The method of claim 12, comprising storing information unique to the read machine-interpretable codes.

15. The method of claim 12, comprising scanning the machine-interpretable codes in an order picking system for at least one of consumer and consumable goods.

16. The method of claim 12, wherein the scanner comprises a camera, the step of operating the scanner in the high power mode comprising using the camera to capture one or more images of the detected machine-interpretable code, and the processing unit being operable to read the machine-interpretable codes based on the captured camera images.

17. The method of claim 16, comprising emitting an illuminating light in the reading mode to improve a quality of the images captured by the camera.

18. The method of claim 12, comprising measuring a least a distance between the scanner and the machine-interpretable codes using detected feedback from the low power range-finding wave active during the low power detection mode.

19. The method of claim 18, comprising enhancing optical properties of the machine-interpretable codes read using the scanner based on the distance measured by the low power range-finding wave.

20. The method of claim 12, comprising switching scanner between the detection mode and the reading mode autonomously, without requiring actuation input from a user of the device.

21. The method of claim 20, comprising switching the scanner from the detection mode to the reading mode only when at least two concurrent conditions are fulfilled: i) the presence of the machine-interpretable code is detected within the scannable field; and ii) an orientation of the scanner is disposed within a preselected acceptable range.

22. The method of claim 21, comprising using a microelectromechanical sensor to measure the orientation of the scanner.

23. The method of claim 21, comprising detecting when the scanner is oriented within the preselected range by determining that the scanner is disposed in a tilted orientation relative to horizontal corresponding to a downward-looking position of a head of a user when wearing the headwear article having said scanner thereon.

24. The method of claim 12, comprising manually actuating a switch to at least one of turn on the device and activate the detection mode, switch the scanner between the detection mode and the reading mode, and turn off the device.

25. A mobile device for optically reading a machine-interpretable code on an item, the mobile device comprising:
  a head-mountable scanner including a code reader with a camera having a camera lens, the code reader being affixed to a headwear article configured to be worn on a head of a user, the code reader being disposed on the headwear article at a forward-facing position thereon to point the camera lens in a direction of the user's field of vision during operation such that a scannable field of the camera lens of the code reader will fall within the user's field of vision when wearing the headwear article; and
  a processing unit in electrical communication with the head-mountable scanner and including at least a power source and an electronic control unit, the electronic control unit controlling the head-mounted scanner to at least switch the code reader between a detection mode and a reading mode thereof;

wherein, in the detection mode, the code reader operates in a low power mode sufficient to detect a presence of at least one of the machine-interpretable code and an object representative of the presence of the machine-interpretable code within the scannable field;

upon detection of the presence of the machine-interpretable code within the scannable field, the electronic control unit switching the code reader into a higher-powered reading mode which is operable for the camera of the code reader to capture one or more images of the machine-interpretable code and for the processing unit to read the machine-interpretable code based on said captured camera images, and wherein the code reader comprises a ranger finder device for distance detection of the machine-interpretable code, the range finder device including at least wave source and at least a sensor operable to detect feedback from the wave source, the wave source emitting a low power range-finding wave in the detection mode.

26. The mobile device of claim 25, comprising a wireless communication device in electrical communication with the processing unit, the wireless communication device being operable to wirelessly transmit information corresponding to the scanned machine-interpretable code to a remote receiving unit.

27. The mobile device of claim 25, wherein the processing unit is operable to measure at least a distance between the camera lens and the machine-interpretable code detected using detected feedback from the wave source during the detection mode, and to enhance optical properties of images captured by the camera during the reading mode based on said measured distance.

28. The mobile device of claim 25, wherein the wave source of the range finder device comprises one of a laser, infrared, ultrasound and radar.

29. The mobile device of claim 25, wherein the head-mountable scanner includes an illuminating light which is operable to emit an illuminating light in the reading mode.

30. The mobile device of claim 25, wherein the electronic control unit is operable to switch the code reader between the detection mode and the reading mode autonomously, without requiring actuation input from the user.

31. The mobile device of claim 30, wherein the electronic control unit switches the code reader from the detection mode to the reading mode when at least two concurrent conditions are fulfilled: i) a presence of the machine-interpretable code is detected within the scannable field; and ii) an orientation of the code reader is disposed within a preselected acceptable range.

32. The mobile device of claim 31, wherein the code reader is oriented in a tilted orientation relative to horizontal within said preselected acceptable range of said orientation of the code reader which corresponds to a downward-looking position of a head of the user when wearing the headwear article having said code reader thereon.

33. The mobile device of claim 31, comprising a microelectromechanical sensor in communication with the processing unit and operable to detect at least said orientation of the code reader.

34. The mobile device of claim 25, wherein the electronic control unit comprises a manually actuated switch disposed to be within reach of a user during operation and in communication with at least the processing unit, the manually actuated switch being operable to at least one of turn on the device and activate the detection mode, switch the code reader between the detection mode and the reading mode, and turn off the device.

35. The mobile device of claim 25, wherein the object representative of the presence of the machine-interpretable code includes one or more target indicators disposed on the item.

36. A mobile device for optically reading a machine-interpretable code on an item, the device comprising:

a head-mountable scanner including a code reader having an optical input, the code reader being affixed to a headwear article configured to be worn on a head of a user, the code reader being disposed on the headwear article at a forward-facing position thereon to point the optical input in a direction of the user's field of vision during operation such that a scannable field of the optical input of the code reader will fall within the user's field of vision when wearing the headwear article, the code reader having at least an active reading mode wherein the code reader is operable to optically read the machine-interpretable code; and a processing unit in electrical communication with the head-mountable scanner and including at least a power source and an electronic control unit, the electronic control unit controlling the head-mounted scanner to autonomously switch the code reader into the active reading mode without requiring actuating input from the user, wherein the control unit is configured to switch the code reader into to the reading mode when at least two concurrent conditions are fulfilled: i) a presence of the machine-interpretable code is detected within the scannable field; and ii) an orientation of the code reader is disposed within a preselected acceptable range, wherein the code reader comprises a wave source and at least a sensor operable to detect feedback from the wave source, the wave source emitting a low power range-finding wave in the detection mode for detecting a distance between the optical input of the code reader and the machine-interpretable code detected in the processing unit.

37. The mobile device of claim 36, comprising a wireless communication device in electrical communication with the processing unit, the wireless communication device being operable to wirelessly transmit information corresponding to the scanned machine-interpretable code to a remote receiving unit for storage and/or data processing.

38. The mobile device of claim 36, wherein the code reader comprises a camera, the camera being operable to capture one or more images of the detected machine-interpretable code and the processing unit is operable to read the machine-interpretable code based on said captured camera images when the code reader is in the active reading mode.

39. The mobile device of claim 36, wherein the head-mountable scanner includes an illuminating light which is operable to emit an illuminating light in the reading mode.

40. The mobile device of claim 36, wherein the wave source of the range finder device comprises one of a laser, infrared, ultrasound and radar.

41. The mobile device of claim 36, wherein the processing unit is operable to enhance optical properties of a images captured by the camera during the reading mode based on said measured distance.

42. The mobile device of claim 36, wherein the orientation of the code reader is within said preselected acceptable range when the code reader is disposed in a tilted orientation relative to horizontal, which corresponds to a downward-looking position of the head of a user when wearing the headwear article having said code reader thereon.

43. The mobile device of claim 36, comprising a micro-electromechanical sensor in communication with the processing unit and operable to detect at least said orientation of the code reader.

44. The mobile device of claim 36, wherein the electronic control unit comprises a manually actuated switch disposed to be within reach of a user during operation and in communication with at least the processing unit, the manually actuated switch being operable to at least one of turn on the device and activate the detection mode, switch the code reader between the detection mode and the reading mode, and turn off the device.

* * * * *